Feb. 7, 1939.  C. FREY  2,146,336
DERIVATION CLIP SERVING FOR JUNCTION OF A COCK TO A WATER CONDUIT
Filed Sept. 28, 1937
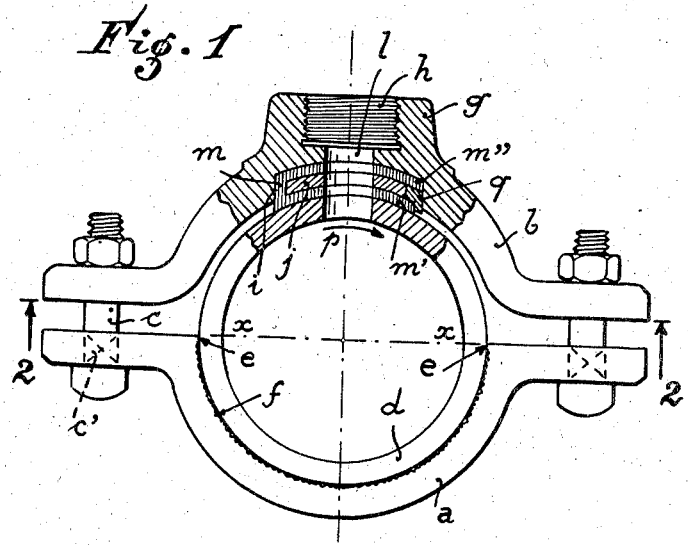
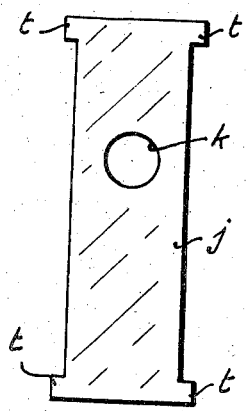
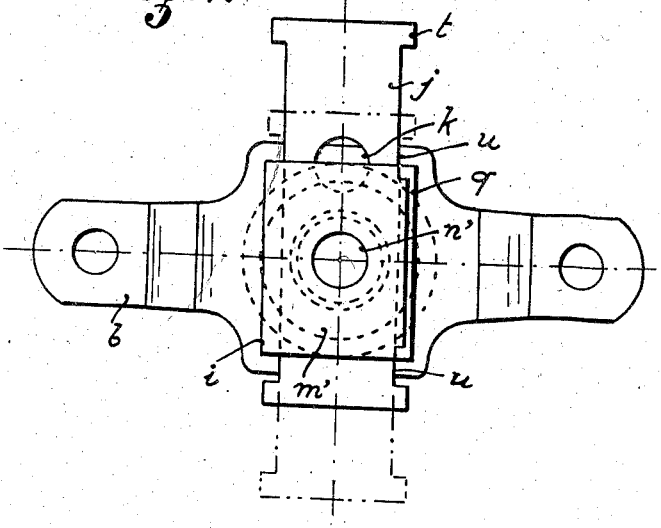
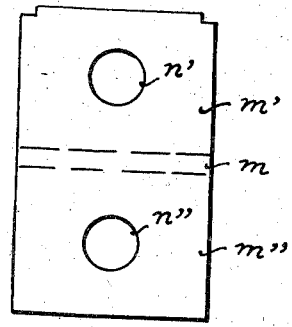
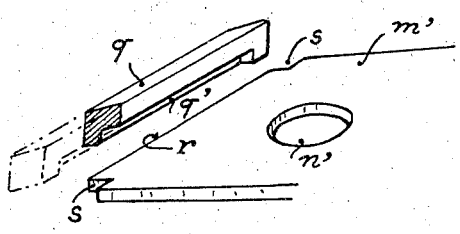
Inventor
Charles Frey
By Blinger, Atty.

Patented Feb. 7, 1939

2,146,336

UNITED STATES PATENT OFFICE 2,146,336

DERIVATION CLIP SERVING FOR JUNCTION OF A COCK TO A WATER CONDUIT

Charles Frey, Arcueil, France

Application September 28, 1937, Serial No. 166,215
In France September 30, 1936

4 Claims. (Cl. 137—69)

The present invention has for an object to provide an improved device for the attachment to and exchange of cocks so attached, to water conduits.

Further it is an object to provide a device of the character stated as will permit cutting off the water to a branch cock when it is desired to make repairs or to remove or replace the cock without arresting the flow of the water in the conduit.

A further object is to accomplish the above results with a minimum of labor cost and in a minimum period of time.

Further the invention has for its object to provide a device which includes a slide clamp arrangement having provision for connecting a branch line cock to a main or conduit and provided as a part of the device with a shut off slide and means to prevent leakage past the slide or while the slide is in one or another of its positions or while it is being moved from one position to another.

The clamp according to the invention consists of two shells, one of which is formed to conform to a whole half-circumference of the conduit and has its inner surface checked or knurled so as to prevent it from sliding on the conduit, the other shell being joined to the first shell by the usual bolts, and containing an inner chamber occupied by a metallic obturator sliding in a sheath of thick leather, and tightly pressed against the conduit by tightening the assembling bolts of the clamp.

The thick leather sheath, enveloping the sliding obturator, is preferably formed by folding around the obturator a leather strip forming in this way a U-shaped packing, the shanks whereof are provided with circular holes adapted respectively to register with the junction axis of the cock.

The part of the leather strip which lies against the conduit is apt to be squeezed when tightening the clamp so as to cause the ovalization of the circular hole provided therein; in order to prevent such distortion, a strip or small rod is placed against the corresponding edge of the joint which is held with the holes centered and maintained so by this strip.

The sliding obturator is provided at each extremity with two lateral projections limiting its movement.

The invention will be better understood by reference to the accompanying drawing showing, merely in the way of example, one, preferred, embodiment. In the drawing:

Fig. 1 represents a clamp fitted to a conduit, partly in diametrical section;

Fig. 2 is an inverted view of one of the shells, seen from below looking in the direction of the arrows 2, 2 of Fig. 1;

Figs. 3 and 4 are respectively plan views of the metallic obturator and the joint before folding, and Fig. 5 a detail perspective view showing the joint arresting strip.

The clamp consists of two shells $a$ and $b$ assembled by bolts $c$ preferably square at one extremity $c'$ (Fig. 1). The shell $a$ is shaped to engage the conduit $d$, over one half of its circumference. The edge $e$ of this shell is intentionally left sharp so as to procure a better adherence to the conduit and to permit a complete tightening, this edge $e$ becoming located after a complete tightening, in line with the axis $xx$ of the conduit. The inner surface $f$ of this shell is preferably checked or knurled in order to prevent it from sliding on the conduit $d$.

The other shell $b$ is provided with a nipple $g$ having threads $h$ to receive therein the threaded extremity of the cock (not shown) to be joined to the delivery section of the clamp.

The inner surface of the shell $b$ is hollowed so as to contain a chamber $i$ communicating with the threaded cavity $h$ via an axial bore $l$.

In the chamber $i$ is placed a metallic key $j$ sliding therein and provided with a hole $k$ (Fig. 3), this key being destined to form, in case of emergency, an obturator for the hole $l$ leading to the cock.

The obturating key $j$ is enveloped by a sheath $m$ of thick leather.

This sheath protects the key against oxidation and ensures a tight fit when the sheath is presented against the conduit $d$ by tightening the bolts $c$.

The sheath is formed by folding a piece of thick leather around the obturating key $j$ (Fig. 4), whereby a U shaped body is obtained, $m'$ and $m''$ being its two shanks. Each shank has a hole ($n'$ or $n''$ respectively) which holes are placed with their axes parallel to the axis of the bore $l$.

On tightening the bolts, the inner shank $m'$ of the joint $m$, viz. the one lying against the conduit $d$, tends to slide in the direction of the arrow $p$ (Fig. 1) and thereby tend to cause the ovalization of the hole $n'$. For this reason, at one side of the chamber $l$ and along the corresponding edge of the lower shank of the joint, a metal rod or strip $q$ is placed which is suitably recessed at $q'$ (Fig. 5) so as to retain, in this recess q', the edge r of the joint and to prevent thereby its lateral displacement. The rod or strip q is held from any lateral displacement since it is kept in the chamber l.

Fig. 2 shows in full lines the position of obturation and in dotted lines the opened position of the passage l.

At each extremity, the obturating key j is provided with lateral projections t limiting the amplitude of the sliding movement of the key and particularly preventing it from sliding beyond the position in which its orifice k is situated in a straight line with the holes n', n" for the passage of water.

During its sliding movement the key is guided by the parts u of the clamp which engage the sides of the key (Fig. 2).

In the inner face, the key j is protected by the folded thick leather joint against all metal corrosion, and on its outer face by a layer or sheath of thick leather which prevents the key from being in contact with the ground. This key consists, as well as the rod or strip q, of non-oxidizable metal.

It will readily be understood how the sliding of the key will suffice, for example, in case of leakage necessitating replacing of the cock, to ensure the perfect obturation of the passage l, secure a perfect tightness and permit all kind of work to be done without the necessity of shutting off the public water conduit. Obviously the clamp according to the invention, can suit cocks of all diameters; its particular utility resides in that it permits junction of nipple cocks to water-charged conduits.

This junction clamp is equally adaptable to all kinds of liquid-carrying conduits, etc.

What I claim, is:

1. In a drilling clamp on a water main serving for the attachment of a branch valve on the main and permitting the replacement of the valve on the main while it is in use without interrupting the flow of water, two semicircular shells assembled by bolts, one of these shells presenting a tap boss intended to receive the tail portion of the valve, the said shell being recessed on its inner semicylindrical surface to provide a recess of uniform depth in which is located without clearance a sheet of heavy leather provided with a hole in axial alinement with the tapped portion of the shell, the said sheet surrounding a metallic closure key also provided with a hole and adapted to slide within the sheet of leather, said closure key having the same curvature as the main pipe on which the said sheet is tightly and snugly pressed by the tightening of the bolts which serve for holding the drilling clamp in position.

2. A drilling clamp for water mains formed of two shells assembled by bolts one of which is recessed to provide a chamber containing a metallic obstructing key element of arcuate shape surrounded on two sides and one one of the edges by a sheet of heavy leather made of a single piece and folded on itself to form a gasket and the inner leg of which is applied against the entire bottom surface of the recess, a metallic bar being disposed within said recess in contact with that edge of the metallic key which is not sheathed by the sheet of leather and this bar presenting longitudinally a groove within which is centered and retained the edge of the outermost leg of the sheet of leather, so that the metallic bar lying against the unprotected edge of the metallic key permits the key to slide while being shifted, serving to prevent upon tightening of the bolts any expansion of the leather and any deformation of the hole provided therein.

3. A drilling clamp formed of two shells assembled by bolts, one of which is provided with a recess containing a metallic obstructing key of arcuate shape surrounded on both of its faces and on one of its edges by a sheet of heavy leather folded on itself to form a gasket and the inner leg of which is applied against the entire bottom surface of the recess, a metallic bar being disposed within said recess in contact with the non-sheathed edge of the key, and this bar presenting in its middle portion only a groove in which the middle tongue cut on the edge of the outer leg of the gasket of leather is received while forced inwardly by its angular relation so that the metallic bar against the edge of which the metallic key slides when being actuated serves to prevent not only any expansion of the gasket of leather, but also any longitudinal displacement of said gasket which serves for holding the joint tight.

4. A drilling lamp formed of two semicircular shells assembled by bolts one of which is recessed to form a chamber containing a sheet of heavy leather folded on itself surrounding on three sides only a metallic obstructing key engaging with its other edge a metallic bar which serves for holding in place the free edge of the sheet of leather, the combined thickness of the metallic key and the surrounding sheet of leather being such with respect to the depth of the recess that after once the bolts have been tightened up, the sheet of leather projects slightly from the recess and engages snugly and tightly only the pipe, the shell having said recess not being in engagement with the outer face of the pipe while the other shell snugly lies against one-half of the entire circumference of the pipe and is provided on its inner face with a checkerboard or knurled design preventing thereby any danger of slippage.

CHARLES FREY.